(12) United States Patent
Miyazaki

(10) Patent No.: US 9,579,929 B2
(45) Date of Patent: Feb. 28, 2017

(54) PNEUMATIC TIRE

(71) Applicant: Sumitomo Rubber Industries, Ltd., Kobe-shi, Hyogo (JP)

(72) Inventor: Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 19 days.

(21) Appl. No.: 14/502,365

(22) Filed: Sep. 30, 2014

(65) Prior Publication Data

US 2015/0013872 A1    Jan. 15, 2015

Related U.S. Application Data

(62) Division of application No. 13/480,813, filed on May 25, 2012, now Pat. No. 8,875,764.

(30) Foreign Application Priority Data

May 27, 2011 (JP) ................................. 2011-119424
Feb. 22, 2012 (JP) ................................. 2012-036760

(51) Int. Cl.
  *B60C 1/00* (2006.01)
  *C08K 3/06* (2006.01)
  *C08K 5/375* (2006.01)

(52) U.S. Cl.
  CPC .......... *B60C 1/0025* (2013.04); *B60C 1/0041* (2013.04); *C08K 3/06* (2013.01); *C08K 5/375* (2013.01); *B60C 2001/005* (2013.04); *B60C 2015/0614* (2013.04); *Y02T 10/862* (2013.01); *Y10T 152/10846* (2015.01)

(58) Field of Classification Search
  CPC ........ B60C 1/0025; B60C 1/0041; C08K 3/06
  USPC .......................................... 152/525; 524/418
  See application file for complete search history.

(56) References Cited

U.S. PATENT DOCUMENTS

| | | | |
|---|---|---|---|
| 2008/0009570 A1* | 1/2008 | Miyazaki | B60C 1/00 524/89 |
| 2009/0005481 A1 | 1/2009 | Ishida et al. | |
| 2010/0224299 A1* | 9/2010 | Miyazaki | B60C 1/0025 152/525 |
| 2011/0094649 A1 | 4/2011 | Miyazaki | |

FOREIGN PATENT DOCUMENTS

| | | |
|---|---|---|
| EP | 1 630 000 A2 | 3/2006 |
| EP | 1 726 615 A1 | 11/2006 |
| EP | 1 757 436 A1 | 2/2007 |
| EP | 1 876 203 A2 | 1/2008 |
| EP | 2 006 122 A1 | 12/2008 |
| EP | 2 014 488 A1 | 1/2009 |
| EP | 2 072 280 A1 | 6/2009 |
| EP | 2 072 289 A1 | 6/2009 |
| EP | 2 147 951 A1 | 1/2010 |
| EP | 2 154 006 A1 | 2/2010 |
| EP | 2 157 128 A1 | 2/2010 |
| EP | 2 159 074 A1 | 3/2010 |
| EP | 2 165 855 A1 | 3/2010 |
| EP | 2 193 939 A1 | 6/2010 |
| JP | 56-32528 A | 4/1981 |
| JP | 2006-63284 A | 3/2006 |
| JP | 2008-24913 A | 2/2008 |
| JP | 2009-84533 A | 4/2009 |
| JP | 2009-84534 A | 4/2009 |
| JP | 4246245 B1 | 4/2009 |
| JP | 4308289 B2 | 8/2009 |
| JP | 2009-249442 A | 10/2009 |
| JP | 2010-58782 A | 3/2010 |
| JP | 2010-90305 A | 4/2010 |
| WO | WO 2007/094370 A1 | 8/2007 |
| WO | WO 2009/072350 A1 | 6/2009 |

OTHER PUBLICATIONS

Friebe et al., "Neodymium Based Ziegler Catalysts", Adv. Polym. Sci. (2006) 204:1-154.*
Friebe et al. (Adv. Polym. Sci. (2006) 204:1-156), "Neokymium Based Ziegler Catalyst—Fundamental Chemistry," p. 1-10.

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The present invention provides a pneumatic tire having excellent durability. Provided is a pneumatic tire including a sidewall and a carcass, the sidewall being produced from a rubber composition for a sidewall which has a specific sulfur content, the carcass being produced from a carcass cord covered with a rubber composition for a carcass topping, and the sulfur contents of the rubber composition for a sidewall and the rubber composition for a carcass topping satisfying a specific relationship. Provided is a pneumatic tire including a clinch and a carcass, the clinch being produced from a rubber composition for a clinch which has a specific sulfur content, the carcass being produced from a carcass cord covered with a rubber composition for a carcass topping, and the sulfur contents of the rubber composition for a clinch and the rubber composition for a carcass topping satisfying a specific relationship.

6 Claims, No Drawings

PNEUMATIC TIRE

CROSS-REFERENCE TO RELATED APPLICATIONS

The present application is a 37 C.F.R. §1.53(b) divisional of U.S. application Ser. No. 13/480,813 filed May 25, 2012, claims priority on Japanese Patent Application Nos. 2011-119424 filed May 27, 2011, and 2012-036760 filed Feb. 22, 2012. The entire contents of each of these applications is hereby incorporated by reference.

TECHNICAL FIELD

The present invention relates to a pneumatic tire.

BACKGROUND ART

A pneumatic tire is constituted from various components such as sidewalls, carcass and clinches, as well as the tread that comes into contact with the road surface. In prior art, the formulation design of rubber compositions for various components involves carrying out laboratory tests on the rubber compositions for the respective components to design the most satisfactory rubber composition for each of the respective components (for instance, Patent Documents 1 to 3). Then, based on the evaluation results of these laboratory tests, the components made from the respective most satisfactory rubber compositions are combined to produce a pneumatic tire. However, the problem is that there are many cases where the durability of the produced pneumatic tire becomes lower than the durability anticipated from the results of the laboratory tests.

Patent Document 1: JP 4308289 B
Patent Document 2: JP 2008-24913 A
Patent Document 3: JP 4246245 B

SUMMARY OF THE INVENTION

An object of the present invention is to solve the above problem and provide a pneumatic tire having excellent durability.

As a result of earnest studies regarding the above problem, the present inventor has arrived at the hypothesis that sulfur migrates between tire components during vulcanization or during use of the tire, an alteration in the properties of each component occurs due to this sulfur migration, and as a result, the durability of the produced pneumatic tire becomes lower than the durability anticipated from the results of the laboratory tests.

Then, focusing on the migration of sulfur from the rubber composition for a carcass topping, which is used for the carcass, the present inventor has found that the durability of the produced pneumatic tire is very excellent if a specific relationship is satisfied between the sulfur contents of the rubber composition for a carcass topping and the rubber composition (e.g. the rubber composition for a sidewall, the rubber composition for a clinch) used for a component (e.g. sidewall, clinch) adjacent to the carcass. Further, he has defined the sulfur contents of the components according to their own desired performances. Thus, he has completed the present invention.

Specifically, according to a first aspect of the present invention, there is provided a pneumatic tire including a sidewall and a carcass, the sidewall being produced from a rubber composition for a sidewall which contains a rubber component and has a sulfur content of greater than 1.41 parts by mass but less than 2.5 parts by mass per 100 parts by mass of the rubber component, the carcass being produced from a carcass cord covered with a rubber composition for a carcass topping which contains a rubber component, and the sulfur contents of the rubber composition for a sidewall and the rubber composition for a carcass topping satisfying the following relationship:

$$-0.2 < \text{(the sulfur content per 100 parts by mass of the rubber component in the rubber composition for a carcass topping)} - \text{(the sulfur content per 100 parts by mass of the rubber component in the rubber composition for a sidewall)} < 1.1.$$

In the first aspect of the present invention, the rubber composition for a sidewall preferably has a sulfur content of greater than 1.61 parts by mass but less than 2.3 parts by mass per 100 parts by mass of the rubber component.

In the first aspect of the present invention, the rubber composition for a carcass topping preferably has a sulfur content of greater than 1.91 parts by mass but less than 3.5 parts by mass per 100 parts by mass of the rubber component.

In the first aspect of the present invention, the rubber composition for a sidewall preferably has a process oil content of 10 parts by mass or less per 100 parts by mass of the rubber component.

In the first aspect of the present invention, the rubber composition for a sidewall preferably has an alkylphenol-sulfur chloride condensate content of 0.2 to 6 parts by mass per 100 parts by mass of the rubber component.

According to a second aspect of the present invention, there is provided a pneumatic tire including a clinch and a carcass, the clinch being produced from a rubber composition for a clinch which contains a rubber component and has a sulfur content of greater than 1.71 parts by mass but less than 2.9 parts by mass per 100 parts by mass of the rubber component, the carcass being produced from a carcass cord covered with a rubber composition for a carcass topping which contains a rubber component, and the sulfur contents of the rubber composition for a clinch and the rubber composition for a carcass topping satisfying the following relationship:

$$-0.6 < \text{(the sulfur content per 100 parts by mass of the rubber component in the rubber composition for a carcass topping)} - \text{(the sulfur content per 100 parts by mass of the rubber component in the rubber composition for a clinch)} < 1.1.$$

In the second aspect of the present invention, the rubber composition for a clinch preferably has a sulfur content of greater than 1.91 parts by mass but less than 2.7 parts by mass per 100 parts by mass of the rubber component.

In the second aspect of the present invention, the rubber composition for a carcass topping preferably has a sulfur content of greater than 1.91 parts by mass but less than 3.5 parts by mass per 100 parts by mass of the rubber component.

In the second aspect of the present invention, the rubber composition for a clinch preferably has a sulfenamide vulcanization accelerator content of 2.5 to 3.5 parts by mass per 100 parts by mass of the rubber component.

In the second aspect of the present invention, the rubber composition for a clinch preferably has an alkylphenol-sulfur chloride condensate content of 0.2 to 6 parts by mass per 100 parts by mass of the rubber component.

According to the first aspect of the present invention, the pneumatic tire has excellent durability since it includes a sidewall and a carcass, the sidewall is produced from a rubber composition for a sidewall with a specific sulfur content, the carcass is produced from a carcass cord covered with a rubber composition for a carcass topping, and the sulfur contents of the rubber composition for a sidewall and the rubber composition for a carcass topping satisfy a specific relationship. In addition, the pneumatic tire also has satisfactory handling stability, fuel economy and elongation at break.

According to the second aspect of the present invention, the pneumatic tire has excellent durability since it includes a clinch and a carcass, the clinch is produced from a rubber composition for a clinch with a specific sulfur content, the carcass is produced from a carcass cord covered with a rubber composition for a carcass topping, and the sulfur contents of the rubber composition for a clinch and the rubber composition for a carcass topping satisfy a specific relationship. In addition, the pneumatic tire also has satisfactory handling stability, fuel economy and elongation at break.

BEST MODE FOR CARRYING OUT THE INVENTION

The First Aspect of the Present Invention

According to the first aspect of the present invention, the pneumatic tire includes a sidewall and a carcass, the sidewall is produced from a rubber composition for a sidewall which contains a rubber component and has a sulfur content of greater than 1.41 parts by mass but less than 2.5 parts by mass per 100 parts by mass of the rubber component, the carcass is produced from a carcass cord covered with a rubber composition for a carcass topping which contains a rubber component, and the sulfur contents of the rubber composition for a sidewall and the rubber composition for a carcass topping satisfy the following relationship:

$-0.2<$(the sulfur content per 100 parts by mass of the rubber component in the rubber composition for a carcass topping)$-$(the sulfur content per 100 parts by mass of the rubber component in the rubber composition for a sidewall)$<1.1$.

As the migration of sulfur from the carcass to the sidewall proceeds, the crosslink density of the sidewall rubber increases, which greatly deteriorates the crack growth resistance and elongation at break of the sidewall rubber, and furthermore the dip surface in contact with the carcass becomes prone to separation, which greatly deteriorates durability. Meanwhile, in the carcass where sulfur is decreased due to the migration, the sulfur concentration surrounding the carcass cord falls down, leading to a lack of sulfur that serves as re-binding sulfur between the carcass cord and the rubber composition for a carcass topping, which decreases durability.

Conversely, when sulfur migrates from the sidewall to the carcass, if the migration is large, the hardness (Hs) of the sidewall decreases, which decreases handling stability. Then, the amount of sulfur increases in the carcass, which improves adhesiveness to the carcass cord; however, the crack growth resistance decreases, resulting in poor durability.

In contrast, in the first aspect of the present invention, since the sulfur contents of the rubber composition for a sidewall and the rubber composition for a carcass topping satisfy the aforementioned relationship while, at the same time, the rubber composition for a sidewall has a specific sulfur content, the migration of sulfur is suppressed so that the sulfur migration can be adjusted to an appropriate degree, which leads to satisfactory durability while maintaining satisfactory handling stability, fuel economy and elongation at break.

The pneumatic tire according to the first aspect of the present invention includes a sidewall and a carcass.

The carcass is a component including a carcass cord and a carcass topping rubber layer, and is also referred to as a case. Specific examples thereof include components as shown in, for instance, Figure 1 of JP 2008-75066 A.

The sidewall is a component placed on the outer side of the carcass, and specific examples thereof include components as shown in, for instance, Figure 1 of JP 2008-75066 A.

In the first aspect of the present invention, the sidewall is produced from a rubber composition for a sidewall and the carcass is produced from a carcass cord covered with a rubber composition for a carcass topping.

In the first aspect of the present invention, the sulfur contents of the rubber composition for a sidewall and the rubber composition for a carcass topping satisfy the following relationship. This enables the durability of the pneumatic tire to be suitably improved. At −0.2 or lower, the adhesiveness between the carcass cord and the rubber composition for a carcass topping decreases, which results in poor durability. At 1.1 or greater, the crosslink density of the sidewall (in particular, the outer surface layer of the sidewall) increases and the crack growth resistance decreases, resulting in poor durability.

$-0.2<$(the sulfur content per 100 parts by mass of the rubber component in the rubber composition for a carcass topping)$-$(the sulfur content per 100 parts by mass of the rubber component in the rubber composition for a sidewall)$<1.1$ Herein, the sulfur content means the total content of pure sulfur in the vulcanizing agent(s) contained in the rubber composition. Here, the content of pure sulfur means, for example, if an oil-containing sulfur is used as the vulcanizing agent, the amount of pure sulfur contained in the oil-containing sulfur, and if a compound containing a sulfur atom (for instance, an alkylphenol-sulfur chloride condensate) is used as the vulcanizing agent, the amount of sulfur atoms contained in the compound.

The lower limit of the relationship is preferably 0, and more preferably 0.2.

The upper limit of the relationship is preferably 1.0, and more preferably 0.9.

In the following, the rubber composition for a sidewall and the rubber composition for a carcass topping, which are used in the first aspect of the present invention, will be described.

Rubber Composition for Sidewall

The vulcanizing agent usable in the rubber composition for a sidewall is not particularly limited, and suitable examples thereof include sulfur, alkylphenol-sulfur chloride condensates, and the like. As the vulcanizing agent, sulfur is preferred, and using sulfur and an alkylphenol-sulfur chloride condensate together is preferred.

Examples of the sulfur include powdered sulfur, precipitated sulfur, colloidal sulfur, insoluble sulfur, highly dispersible sulfur, and the like.

Compared to conventional crosslinking with sulfur, the use of an alkylphenol-sulfur chloride condensate enables a thermally stable crosslinked structure, leading to a great improvement in fuel economy and durability, and also an improvement in handling stability. In addition, since the alkylphenol-sulfur chloride condensate bonds sturdily to the rubber component, it is thought that sulfur contained in the condensate is less likely to migrate.

As the alkylphenol-sulfur chloride condensate, an alkylphenol-sulfur chloride condensate represented by the following formula (1) is preferred.

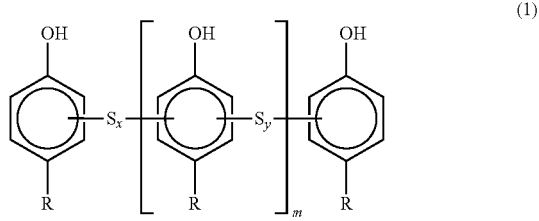

(1)

In the formula, Rs may be the same as or different from each other, and each represent a C5 to C15 alkyl group or an amyl group; x and y may be the same as or different from each other, and each represent an integer of 1 to 4; and m represents an integer of 0 to 300.

From the viewpoint of good dispersibility of the alkylphenol-sulfur chloride condensate into the rubber component, m is an integer of 0 to 300, preferably an integer of 0 to 100, and more preferably an integer of 3 to 100. If m is 3 or greater, the effects of improvement in scorch delay, handling stability, fuel economy, elongation at break and durability are large. From the viewpoint that a high degree of hardness can be exhibited efficiently (namely, reversion resistance), x and y are each an integer of 1 to 4, and are preferably both 2. From the viewpoint of good dispersibility of the alkylphenol-sulfur chloride condensate into the rubber component, Rs are each a C5 to C15 alkyl group or an amyl group, and preferably a C8 to C15 alkyl group. If the number of carbons is 8 or more, the effects of improvement in scorch delay, handling stability, fuel economy, elongation at break and durability are large.

The alkylphenol-sulfur chloride condensate can be prepared by a known method, and examples of the method include, but not particularly limited to, a method involving reacting an alkylphenol and sulfur chloride at a molar ratio of 1:0.9-1.25, for example.

Specific examples of the alkylphenol-sulfur chloride condensate include TACKIROL V200 (in formula (1): $R=C_8H_{17}$; x=2; y=2; m=an integer from 0 to 100) and TS3101 (in formula (1): $R=C_{12}H_{25}$; x=2; y=2; m=an integer from 170 to 210) manufactured by Taoka Chemical Co., Ltd., and the like.

The sulfur content of the alkylphenol-sulfur chloride condensate corresponds to a proportion determined by heating the condensate to 800-1000° C. in a combustion furnace for conversion to $SO_2$ gas or $SO_3$ gas, and then optically determining the amount of sulfur from the gas yield.

The alkylphenol-sulfur chloride condensate content per 100 parts by mass of the rubber component is preferably 0.2 parts by mass or greater, and more preferably 0.5 parts by mass or greater. At less than 0.2 parts by mass, the effects from the use of an alkylphenol-sulfur chloride condensate are not sufficiently obtained. The content is preferably 6 parts by mass or less, and more preferably 2 parts by mass or less. At greater than 6 parts by mass, the durability may greatly decrease.

In the rubber composition for a sidewall, the sulfur content per 100 parts by mass of the rubber component is greater than 1.41 parts by mass, preferably greater than 1.61 parts by mass, and more preferably greater than 1.85 parts by mass. At 1.41 parts by mass or less, the amount of influx of sulfur from the carcass becomes large, which greatly deteriorates the crack growth resistance and elongation at break of the sidewall rubber, and furthermore causes easy separation at the dip surface in contact with the carcass, greatly deteriorating durability. In addition, sufficient handling stability is not obtained. The content is less than 2.5 parts by mass, preferably less than 2.3 parts by mass, and more preferably less than 2.2 parts by mass. At 2.5 parts by mass or greater, the elongation at break (in particular, elongation at break after heat aging), crack growth resistance, fuel economy and durability deteriorate.

Examples of rubbers which may be contained in the rubber component of the rubber composition for a sidewall include, but not particularly limited to, diene rubbers such as natural rubber (NR), isoprene rubber (IR), butadiene rubber (BR), styrene butadiene rubber (SBR), styrene isoprene butadiene rubber (SIBR), chloroprene rubber (CR) and acrylonitrile butadiene rubber (NBR). The rubbers may be used alone, or two or more species may be used in combination. Among these, from the reason that satisfactory durability is obtained while maintaining satisfactory handling stability, fuel economy and elongation at break, NR or BR is preferred, and a combination of NR and BR is more preferred.

There is no particular limitation regarding the NR, and those that are usually used in the tire industry may be used, such as, for instance, SIR20, RSS#3, TSR20 and IR2200.

The NR content in 100% by mass of the rubber component is preferably 40% by mass or greater, and more preferably 50% by mass or greater. The NR content is preferably 80% by mass or less, and more preferably 70% by mass or less. If the NR content is within the above range, satisfactory durability is obtained while maintaining satisfactory handling stability, fuel economy and elongation at break.

There is no particular limitation regarding the BR, and those that are usually used in the tire industry may be used, such as, for instance, high cis-content BR such as BR1220 manufactured by Zeon Corporation and BR150B manufactured by Ube Industries, Ltd., BR containing a 1,2-syndiotactic polybutadiene crystal (SPB) such as VCR412 and VCR617 manufactured by Ube Industries, Ltd., high vinyl-content BR such as Europrene BR HV80 manufactured by Polimeri Europa, and BR synthesized using a rare-earth catalyst (rare-earth BR). In addition, tin-modified butadiene rubber (tin-modified BR), which has been modified with a tin compound, may also be used. Among these, from the reason that satisfactory durability is obtained while maintaining satisfactory handling stability, fuel economy and elongation at break, rare-earth BR is preferred. In addition, if tin-modified BR is used along with rare-earth BR, the fuel economy can be further improved.

The rare-earth catalyst used in the synthesis of rare-earth BR may be a known one such as a catalyst containing a lanthanide rare-earth compound, an organoaluminum compound, an aluminoxane, or a halogen-containing compound, optionally with a Lewis base. Among these, an Nd catalyst is particularly preferred which contains a neodymium (Nd)-containing compound as the lanthanide rare-earth compound.

Examples of the lanthanide rare-earth compound include halides, carboxylates, alcoholates, thioalcoholates, and amides of rare-earth metals having atomic numbers from 57 to 71. Among them, Nd catalysts are preferably used as described above in terms of obtaining BR having a high cis content and a low vinyl content.

The organoaluminum compound may be one represented by $AlR^a R^b R^c$ (wherein $R^a$, $R^b$ and $R^c$ may be the same as or different from each other, and each represent hydrogen or a C1 to C8 hydrocarbon group). Examples of the aluminoxane include acyclic aluminoxanes and cyclic aluminoxanes. Examples of the halogen-containing compound include aluminum halides represented by $AlX_k R^d_{3-k}$ (wherein X represents a halogen, $R^d$ represents a C1 to C20 alkyl group, aryl group or aralkyl group, and k represents 1, 1.5, 2 or 3); strontium halides such as $Me_3SrCl$, $Me_2SrCl_2$, $MeSrHCl_2$ and $MeSrCl_3$; and metal halides such as silicon tetrachloride, tin tetrachloride and titanium tetrachloride. The Lewis base is used for complexation of the lanthanide rare-earth compound, and may suitably be a compound such as acetylacetone, a ketone, or an alcohol.

At the time of the polymerization of butadiene, the rare-earth catalyst may be used dissolved in an organic solvent (e.g. n-hexane, cyclohexane, n-heptane, toluene, xylene, benzene), or supported on an appropriate carrier such as silica, magnesia or magnesium chloride. With regard to the polymerization conditions, the polymerization may be either solution polymerization or bulk polymerization, the preferred polymerization temperature is −30 to 150° C., and the polymerization pressure may be appropriately selected depending on the other conditions.

In the rare-earth BR, the ratio (Mw/Mn) of the weight average molecular weight (Mw) to the number average molecular weight (Mn) is preferably 1.2 or greater, and more preferably 1.5 or greater. If it is less than 1.2, the processability tends to significantly deteriorate. The Mw/Mn is preferably 5 or lower, and more preferably 4 or lower. If it exceeds 5, the improvement effect on abrasion resistance tends to be small.

The Mw of rare-earth BR is preferably 300,000 or greater and more preferably 500,000 or greater, while the Mw is preferably 1,500,000 or lower and more preferably 1,200,000 or lower. The Mn of rare-earth BR is preferably 100,000 or greater and more preferably 150,000 or greater, while the Mn is preferably 1,000,000 or lower and more preferably 800,000 or lower. If the Mw or Mn is lower than the lower limit, the abrasion resistance tends to decrease and the fuel economy tends to deteriorate. If it exceeds the upper limit, the processability may decrease.

In the present invention, the Mw and Mn are values determined using a gel permeation chromatograph (GPC) and calibrated relative to polystyrene standards.

The cis content of rare-earth BR is preferably 90% by mass or greater, more preferably 93% by mass or greater, and further preferably 95% by mass or greater. If the cis content is less than 90% by mass, the abrasion resistance and fuel economy may decrease.

The vinyl content of rare-earth BR is preferably 1.8% by mass or less, more preferably 1.0% by mass or less, further preferably 0.5% by mass or less, and particularly preferably 0.3% by mass or less. If the vinyl content exceeds 1.8% by mass, the abrasion resistance may decrease.

In the present invention, the vinyl content (the amount of 1,2-butadiene units) and the cis content (the amount of cis-1,4-butadiene units) of rare-earth BR can be measured by infrared absorption spectrometry.

The BR content in 100% by mass of the rubber component is preferably 20% by mass or greater, and more preferably 30% by mass or greater. The BR content is preferably 60% by mass or less, and more preferably 50% by mass or less. If the BR content is within the range described above, satisfactory durability is obtained while maintaining satisfactory handling stability, fuel economy and elongation at break.

Process oil loosens sulfur-crosslinked polymer matrix to facilitate the migration of sulfur. The process oil has a larger effect in accelerating the sulfur migration compared to other softeners such as C5 resin. Then, since a rubber composition for a sidewall has a relatively low crosslink density, the influx of sulfur from the carcass can be more suppressed if the rubber composition has a smaller content of process oil. Consequently, the process oil content per to 100 parts by mass of the rubber component is preferably 10 parts by mass or less. If it is greater than 10 parts by mass, the amount of influx of sulfur from the carcass may increase, resulting in poor durability.

The rubber composition for a sidewall may contain carbon black. Containing carbon black can increase reinforcement, resulting in an improvement in durability and handling stability. Examples of usable carbon black include, but not particularly limited to, GPF, FEF, HAF, ISAF, SAF, and the like.

In the case of using carbon black, the nitrogen adsorption specific surface area ($N_2SA$) of carbon black is preferably 20 $m^2/g$ or greater. If the $N_2SA$ is less than 20 $m^2/g$, the durability and handling stability may decrease. The $N_2SA$ of carbon black is preferably 100 $m^2/g$ or less, and more preferably 60 $m^2/g$ or less. If the $N_2SA$ exceeds 100 $m^2/g$, sufficient fuel economy and processability may not be obtained.

Herein, the nitrogen adsorption specific surface area of carbon black is determined based on JIS K 6217-2:2001.

The carbon black content is preferably 10 parts by mass or greater, and more preferably 20 parts by mass or greater per 100 parts by mass of the rubber component. At less than 10 parts by mass, sufficient reinforcement may not be obtained, and the durability and handling stability tend to deteriorate. The carbon black content is preferably 100 parts by mass or less, and more preferably 70 parts by mass or less per 100 parts by mass of the rubber component. At greater than 100 parts by mass, the fuel economy may deteriorate.

The rubber composition may contain, aside from the above ingredients, a compounding ingredient used conventionally in the rubber industry, such as a filler (e.g. silica), wax, an antioxidant, an age resistor, a vulcanization activator (e.g. stearic acid, zinc oxide), a vulcanization accelerator, or the like.

Examples of the vulcanization accelerator include guanidine, aldehyde-amine, aldehyde-ammonia, thiazole, sulfenamide, thiourea, thiuram, dithiocarbamate, xanthate compounds. These vulcanization accelerators may be used alone, or two or more species may be used in combination. Among these, from the viewpoints of the dispersibility into the rubber component and the stability of the properties of the vulcanizate, sulfenamide vulcanization accelerators (e.g. N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), N,N-diisopropyl-2-benzothiazole sulfenamide) are preferred, and TBBS is more preferred.

The vulcanization accelerator content per 100 parts by mass of the rubber component is preferably 0.4 parts by mass or greater. The content is preferably 2.0 parts by mass or less, and more preferably 1.5 parts by mass or less. If the vulcanization accelerator content is within the range described above, a crosslink density and crack growth resistance that are suitable for a sidewall rubber are obtained, and the sulfur migration can be adjusted to an appropriate degree, so that the effects of the present invention can be obtained more successfully.

As the method for producing the rubber composition for a sidewall, a known method may be used. For example, the rubber composition may be produced by a method involving kneading the ingredients described above using a rubber kneader such as open roll mill or Banbury mixer.

Rubber Composition for Carcass Topping

Examples of rubbers which may be contained in the rubber component of the rubber composition for a carcass topping include, but not particularly limited to, diene rubbers as mentioned for the rubber composition for a sidewall. The rubbers may be used alone, or two or more species may be used in combination. Among these, for the reason that satisfactory durability is obtained while maintaining satisfactory handling stability, fuel economy and elongation at break, NR or SBR is preferred, and a combination of NR and SBR is more preferred. In addition, a combination of NR, SBR and BR is preferred as the crack growth resistance can be improved.

There is no particular limitation regarding the NR, and ones as mentioned for the rubber composition for a sidewall may be used.

The NR content in 100% by mass of the rubber component is preferably 50% by mass or greater, and more preferably 60% by mass or greater. The NR content is preferably 90% by mass or less, and more preferably 80% by mass or less. If the NR content is within the range described above, satisfactory durability is obtained while maintaining satisfactory handling stability, fuel economy and elongation at break.

There is no particular limitation regarding the SBR, and those that are generally used in the tire industry may be used, such as emulsion-polymerized styrene butadiene rubber (E-SBR) and solution-polymerized styrene butadiene rubber (S-SBR). Among these, for the reason that satisfactory durability is obtained while maintaining satisfactory handling stability, fuel economy and elongation at break, E-SBR is preferred.

The SBR content in 100% by mass of the rubber component is preferably 10% by mass or greater, and more preferably 20% by mass or greater. The SBR content is preferably 50% by mass or less, and more preferably 40% by mass or less. If the SBR content is within the range described above, satisfactory durability is obtained while maintaining satisfactory handling stability, fuel economy and elongation at break.

The vulcanizing agent that can be used is not particularly limited, and ones as mentioned for the rubber composition for a sidewall may be used.

In the rubber composition for a carcass topping, the sulfur content per 100 parts by mass of the rubber component is preferably greater than 1.91 parts by mass, and more preferably greater than 2.41 parts by mass. At 1.91 parts by mass or less, the adhesiveness to the carcass cord may decrease, resulting in poor durability. In addition, sufficient fuel economy and elongation at break may not be obtained. The content is preferably less than 3.5 parts by mass, more preferably less than 3.1 parts by mass, and further preferably less than 3.0 parts by mass. At 3.5 parts by mass or greater, the elongation at break and crack growth resistance may decrease, resulting in poor durability. In addition, sufficient fuel economy may not be obtained. If the sulfur content is within the range described above, satisfactory elongation at break, crack growth resistance and adhesiveness to the carcass cord, and therefore satisfactory durability are obtained while maintaining satisfactory handling stability and fuel economy.

The process oil content per 100 parts by mass of the rubber component is preferably 4 to 12 parts by mass. If the process oil content is within the range described above, satisfactory sheet processability is obtained, and the sulfur migration can be adjusted to an appropriate degree.

The rubber composition for a carcass topping may contain carbon black. Containing carbon black can increase reinforcement, resulting in an improvement in durability and handling stability.

In the case of using carbon black, the nitrogen adsorption specific surface area ($N_2SA$) of carbon black is preferably 40 $m^2/g$ or greater, and more preferably 60 $m^2/g$ or greater. If the $N_2SA$ is less than 40 $m^2/g$, the durability and handling stability may decrease. The $N_2SA$ of carbon black is preferably 150 $m^2/g$ or less, and more preferably 100 $m^2/g$ or less. If the $N_2SA$ exceeds 150 $m^2/g$, the dispersibility may be poor, and sufficient fuel economy may not be obtained.

The carbon black content is preferably 10 parts by mass or greater, and more preferably 20 parts by mass or greater per 100 parts by mass of the rubber component. At less than 10 parts by mass, sufficient reinforcement may not be obtained, and the durability and handling stability tend to deteriorate. The carbon black content is preferably 90 parts by mass or less, and more preferably 60 parts by mass or less per 100 parts by mass of the rubber component. At greater than 90 parts by mass, the fuel economy may deteriorate.

With the purpose of improving adhesiveness to the cord, the rubber composition for a carcass topping may contain, along with a methylene donor, at least one compound selected from resorcinol resin (condensate), modified resorcinol resin (condensate), cresol resin, and modified cresol resin.

The rubber composition may contain, aside from the above ingredients, a compounding ingredient used conventionally in the rubber industry, such as a filler (e.g. silica), wax, an antioxidant, an age resistor, a vulcanization activator (e.g. stearic acid, zinc oxide), a vulcanization accelerator, or the like.

As the vulcanization accelerator, ones as mentioned for the rubber composition for a sidewall may be suitably used.

The vulcanization accelerator content per 100 parts by mass of the rubber component is preferably 0.3 parts by mass or greater, more preferably 0.8 parts by mass or greater, and further preferably 0.9 parts by mass or greater. The content is preferably 2.5 parts by mass or less, and more preferably 1.7 parts by mass or less. If the vulcanization accelerator content is within the range described above, a crosslink density suitable for a carcass topping rubber is obtained, and at the same time the sulfur migration can be adjusted to an appropriate degree, so that the effects of the present invention are obtained more successfully.

As the method for producing the rubber composition for a carcass topping, a method as mentioned for the rubber composition for a sidewall may be used.

The pneumatic tire according to the first aspect of the present invention can be produced by a usual method, using the rubber composition described above. Specifically, a rubber composition with various additives mixed as necessary, before vulcanization, is extruded and processed into the shape of each component of the tire (in the case of a sidewall, a rubber composition for a sidewall is formed into the shape of a sidewall, and in the case of a carcass, a sheet of a rubber composition for a carcass topping, before vulcanization, is pressed against and covered onto the top and bottom of carcass cords to form the shape of a carcass), and arranged and assembled with other tire components by a usual method on a tire building machine to form an unvulcanized tire, and then the unvulcanized tire is heated and pressurized in a vulcanizer, whereby a tire can be produced.

Examples of the carcass cord include cords produced from fiber such as polyethylene, nylon, aramid, glass fiber, polyester, rayon, or polyethylene terephthalate. In addition, a hybrid cord produced from a plurality of fibers may be used.

The Second Aspect of the Present Invention

According to the second aspect of the present invention, the pneumatic tire includes a clinch and a carcass, the clinch is produced from a rubber composition for a clinch which contains a rubber component and has a sulfur content of greater than 1.71 parts by mass but less than 2.9 parts by mass per 100 parts by mass of the rubber component, the carcass is produced from a carcass cord covered with a rubber composition for a carcass topping which contains a rubber component, and the sulfur contents of the rubber composition for a clinch and the rubber composition for a carcass topping satisfy the following relationship:

−0.6<(the sulfur content per 100 parts by mass of the rubber component in the rubber composition for a carcass topping)−(the sulfur content per 100 parts by mass of the rubber component in the rubber composition for a clinch)<1.1.

As the migration of sulfur from the carcass to the clinch proceeds, the crosslink density of the clinch rubber increases, which greatly deteriorates the elongation at break of the clinch rubber, and furthermore the dip surface in contact with the carcass becomes prone to separation, which greatly deteriorates durability. Meanwhile, in the carcass where sulfur is decreased due to the migration, the sulfur concentration surrounding the carcass cord falls down, leading to a lack of sulfur that serves as re-binding sulfur between the carcass cord and the rubber composition for a carcass topping, which decreases durability.

Conversely, when sulfur migrates from the clinch to the carcass, if the migration is large, the hardness (Hs) of the clinch decreases, leading to decrease in rim-slippage resistance (durability) and handling stability. Then, the amount of sulfur increases in the carcass, which improves adhesiveness to the carcass cord; however, the crack growth resistance decreases, resulting in poor durability.

In contrast, in the second aspect of the present invention, since the sulfur contents of the rubber composition for a clinch and the rubber composition for a carcass topping satisfy the aforementioned relationship while, at the same time, the rubber composition for a clinch has a specific sulfur content, the migration of sulfur is suppressed so that the sulfur migration can be adjusted to an appropriate degree, which leads to satisfactory durability while maintaining satisfactory handling stability, fuel economy and elongation at break.

The pneumatic tire according to the second aspect of the present invention includes a clinch and a carcass.

The clinch is a rubber portion covering an area that comes into contact with the rim, located at an inner edge of the sidewall, and is also referred to as a clinch apex or rubber chafer. Specific examples thereof include components as shown in, for instance, Figure 1 of JP 2008-75066 A. The carcass is as described above.

In the second aspect of the present invention, the clinch is produced from a rubber composition for a clinch and the carcass is produced from a carcass cord covered with a rubber composition for a carcass topping.

In the second aspect of the present invention, the sulfur contents of the rubber composition for a clinch and the rubber composition for a carcass topping satisfy the following relationship. This enables the durability of the pneumatic tire to be suitably improved. At −0.6 or lower, sulfur migrates from the clinch to the carcass, which decreases the hardness (Hs) of the clinch, leading to decrease in rim-slippage resistance (durability) and handling stability. At 1.1 or greater, sulfur migrates from the carcass to the clinch, which decreases the elongation at break in the clinch and also decreases the adhesiveness to the carcass cord in the carcass, resulting in poor durability.

−0.6<(the sulfur content per 100 parts by mass of the rubber component in the rubber composition for a carcass topping)−(the sulfur content per 100 parts by mass of the rubber component in the rubber composition for a clinch)<1.1

The lower limit of the relationship is preferably −0.4, and more preferably −0.2.

The upper limit of the relationship is preferably 1.0, and more preferably 0.9.

In the following, the rubber composition for a clinch which is used in the second aspect of the present invention will be described. The rubber composition for a carcass topping is as described in the first aspect of the present invention.

Rubber Composition for Clinch

The vulcanizing agent that can be used in the rubber composition for a clinch is not particularly limited, and ones as mentioned for the rubber composition for a sidewall may be suitably used. Similarly to the rubber composition for a sidewall, as the vulcanizing agent, sulfur is preferred, and using sulfur and an alkylphenol-sulfur chloride condensate together is preferred.

The alkylphenol-sulfur chloride condensate content per 100 parts by mass of the rubber component is preferably 0.2 parts by mass or greater, and more preferably 0.5 parts by mass or greater. If it is less than 0.2 parts by mass, the effects (in particular on fuel economy) from the use of an alkylphenol-sulfur chloride condensate are not sufficiently obtained. The content is preferably 6 parts by mass or less, and more preferably 2 parts by mass or less. If it exceeds 6 parts by mass, the durability (in particular, elongation at break) may greatly decrease.

In the rubber composition for a clinch, the sulfur content per 100 parts by mass of the rubber component is greater than 1.71 parts by mass, preferably greater than 1.81 parts by mass, and more preferably greater than 1.91 parts by mass. At 1.71 parts by mass or less, the amount of influx of sulfur from the carcass becomes large, which greatly deteriorates the elongation at break of the clinch rubber, and furthermore causes easy separation at the dip surface in contact with the carcass, greatly deteriorating durability. In addition, sufficient handling stability and fuel economy are not obtained. The content is less than 2.9 parts by mass, preferably less than 2.7 parts by mass, and more preferably less than 2.5 parts by mass. At 2.9 parts by mass or greater, the abrasion resistance decreases due to the heat oxidation degradation of the clinch rubber itself, and cracks will be formed in the abraded portion, which decreases durability. If the sulfur content is within the range described above, satisfactory elongation at break, crack growth resistance and abrasion resistance, and therefore satisfactory durability are obtained while maintaining satisfactory handling stability and fuel economy.

Examples of rubbers which may be contained in the rubber component of the rubber composition for a clinch include, but not particularly limited to, diene rubbers as mentioned for the rubber composition for a sidewall. The rubbers may be used alone, or two or more species may be used in combination. Among these, from the reason that satisfactory durability is obtained while maintaining satisfactory handling stability, fuel economy and elongation at break, NR or BR is preferred, and a combination of NR and BR is more preferred.

There is no particular limitation regarding the NR, and ones as mentioned for the rubber composition for a sidewall may be used.

The NR content in 100% by mass of the rubber component is preferably 10% by mass or greater, and more preferably 20% by mass or greater. The NR content is preferably 50% by mass or less, and more preferably 40% by mass or less. If the NR content is within the range described above, satisfactory durability is obtained while maintaining satisfactory handling stability, fuel economy and elongation at break.

There is no particular limitation regarding the BR, and ones as mentioned for the rubber composition for a sidewall may be used. Among these, from the reason that satisfactory durability is obtained while maintaining satisfactory handling stability, fuel economy and elongation at break, rare-earth BR or 1,2-syndiotactic polybutadiene crystal-containing BR (VCR) mentioned above is preferred. In addition, if rare-earth BR is used along with tin-modified BR, the fuel economy can be further improved.

The BR content in 100% by mass of the rubber component is preferably 50% by mass or greater, and more preferably 60% by mass or greater. The BR content is preferably 90% by mass or less, and more preferably 80% by mass or less. If the BR content is within the range described above, satisfactory durability is obtained while maintaining satisfactory handling stability, fuel economy and elongation at break.

Since a rubber composition for a clinch has a relatively high crosslink density, the process oil content is not particularly limited, and is preferably 3 to 12 parts by mass, and more preferably 3 to 7 parts by mass per 100 parts by mass of the rubber component. If the process oil content is within the range described above, the sulfur migration can be adjusted to an appropriate degree.

The rubber composition for a clinch may preferably contain carbon black. Containing carbon black can increase reinforcement, resulting in an improvement in durability and handling stability.

In the case of using carbon black, the nitrogen adsorption specific surface area ($N_2SA$) of carbon black is preferably 40 $m^2/g$ or greater, and more preferably 60 $m^2/g$ or greater. If the $N_2SA$ is less than 40 $m^2/g$, the durability and handling stability may decrease. The $N_2SA$ of carbon black is preferably 150 $m^2/g$ or less, and more preferably 100 $m^2/g$ or less. If the $N_2SA$ exceeds 150 $m^2/g$, sufficient fuel economy may not be obtained.

The carbon black content is preferably 30 parts by mass or greater, and more preferably 50 parts by mass or greater per 100 parts by mass of the rubber component. At less than 30 parts by mass, sufficient reinforcement may not be obtained, and the durability and handling stability tend to deteriorate. The carbon black content is preferably 120 parts by mass or less, and more preferably 80 parts by mass or less per 100 parts by mass of the rubber component. At greater than 120 parts by mass, the fuel economy may deteriorate.

The rubber composition may contain, aside from the above ingredients, a compounding ingredient used conventionally in the rubber industry, such as a filler (e.g. silica), wax, an antioxidant, an age resistor, a vulcanization activator (e.g. stearic acid, zinc oxide), a vulcanization accelerator, or the like.

As the vulcanization accelerator, ones as mentioned for the rubber composition for a sidewall may be suitably used.

The vulcanization accelerator (preferably sulfenamide vulcanization accelerator) content per 100 parts by mass of the rubber component is preferably 2.5 parts by mass or greater, and more preferably 2.8 parts by mass or greater. The content is preferably 3.5 parts by mass or less. If the vulcanization accelerator content is within the range described above, a crosslink density suitable for a clinch rubber is obtained, leading to satisfactory handling stability and fuel economy, and at the same time the sulfur migration can be adjusted to an appropriate degree, so that the effects of the present invention are obtained more successfully.

As the method for producing the rubber composition for a clinch, a method as mentioned for the rubber composition for a sidewall may be used.

The pneumatic tire according to the second aspect of the present invention can be produced by a usual method, using the rubber composition described above. Specifically, a rubber composition with various additives mixed as necessary, before vulcanization, is extruded and processed into the shape of each component of the tire (in the case of a clinch, a rubber composition for a clinch is formed into the shape of a clinch, and in the case of a carcass, a sheet of a rubber composition for a carcass topping, before vulcanization, is pressed against and covered onto the top and bottom of carcass cords to form the shape of a carcass), and arranged and assembled with other tire components by a usual method on a tire building machine to form an unvulcanized tire, and then the unvulcanized tire is heated and pressurized in a vulcanizer, whereby a tire can be produced.

As the carcass cord, ones as mentioned in the first aspect of the present invention may be used.

EXAMPLES

The present invention will be described in more detail based on examples; however, the present invention is not limited to the examples.

Chemicals used in the Examples and Comparative Examples are listed below.

NR: TSR20

SBR: SBR1502 (E-SBR) manufactured by Zeon Corporation

BR1: CB24 (BR synthesized using Nd catalyst; Tg: −116° C.; cis content: 96% by mass; vinyl content: 0.7% by mass; $ML_{1+4}$ (100° C.): 45; Mw/Mn: 2.69; Mw: 500,000; Mn: 186,000) manufactured by LANXESS K.K.

BR2: BR1250H (tin-modified BR) manufactured by Zeon Corporation

Carbon black 1: DIABLACK H (N330; $N_2SA$: 79 $m^2/g$) manufactured by Mitsubishi Chemical Corporation Carbon black 2: DIABLACK E (N550; $N_2SA$: 41 $m^2/g$) manufactured by Mitsubishi Chemical Corporation Silica: ULTRASIL VN3 ($N_2SA$: 175 $m^2/g$) manufactured by Degussa Antioxidant: ANTIGENE 6C (N-(1,3-dimethylbutyl)-N'-phenyl-p-phenylenediamine) manufactured by Sumitomo Chemical Co., Ltd.

SUMIKANOL 620: modified resorcinol resin manufactured by Taoka Chemical Co., Ltd.

SUMIKANOL 507A: methylene donor manufactured by Taoka Chemical Co., Ltd.

Zinc oxide: zinc oxide #1 manufactured by Mitsui Mining & Smelting Co., Ltd.
Stearic acid: stearic acid "Tsubaki" manufactured by NOF Corporation
10% oil-containing insoluble sulfur: SEIMI OT manufactured by Nippon Kanryu Industry Co., Ltd.
TBBS: NOCCELER NS (N-tert-butyl-2-benzothiazolyl-sulfenamide) manufactured by Ouchi Shinko Chemical Industrial Co., Ltd.
Process oil: TDAE manufactured by H&R
Wax: Ozoace 0355 manufactured by Nippon Seiro Co., Ltd.
V200: TACKIROL V200 (alkylphenol-sulfur chloride condensate (sulfur content: 24% by mass, weight average molecular weight: 9,000), in formula (1): $R=C_8H_{17}$; $x=2$; $y=2$; $m=$an integer from 0 to 100) manufactured by Taoka Chemical Co., Ltd.
TS3101: TS3101 (alkylphenol-sulfur chloride condensate (sulfur content: 27% by mass, weight average molecular weight: 62,000), in formula (1): $R=C_{12}H_{25}$; $x=2$; $y=2$; $m=$an integer from 170 to 210) manufactured by Taoka Chemical Co., Ltd.
C5 resin: Marukarez T-100AS manufactured by Maruzen Petrochemical Co., Ltd.

Examples and Comparative Examples

In accordance with the formulation amounts indicated in Tables 1 to 3, the ingredients other than SUMIKANOL 507A, vulcanizing agent and vulcanization accelerator were kneaded using a Banbury mixer at 150° C. for 5 minutes to obtain a kneaded mixture. Next, SUMIKANOL 507A as appropriate, the vulcanizing agent(s) and vulcanization accelerator were added to the obtained kneaded mixture, and kneaded using an open roll mill at 80° C. for 3 minutes to obtain an unvulcanized rubber composition. A portion of the obtained unvulcanized rubber composition was press-vulcanized at 170° C. for 12 minutes to obtain a vulcanized rubber composition.

In addition, another portion of the obtained unvulcanized rubber composition was formed into, in the case of a rubber composition for a clinch, the shape of a clinch, in the case of a rubber composition for a carcass topping, the shape of a carcass by forming a topping rubber sheet with a thickness of 1.2 mm and then covering a carcass cord (polyester cord) with the sheet, and in the case of a rubber composition for a sidewall, the shape of a sidewall. Then, in accordance with the combinations indicated in Tables 2 and 3, the resultant components were assembled with other tire components, and press-vulcanized at 170° C. for 12 minutes to produce a test pneumatic tire (195/65R15).

The obtained vulcanized rubber compositions and test pneumatic tires were used to carry out the following evaluations. The respective test results are shown in Tables 1 to 3.

Complex Elastic Modulus (Hardness) (E*), Fuel Economy (tan δ)

The loss tangent (tan δ) and complex elastic modulus (E*) of each vulcanized rubber composition were measured using a viscoelastic spectrometer (manufactured by Iwamoto Seisakusho Co., Ltd.) under the conditions: a temperature of 70° C.; an initial strain of 10%; a dynamic strain of 2%; and a frequency of 10 Hz.

A smaller tan δ value indicates lower rolling resistance and better fuel economy. A larger E* value indicates better handling stability.

Tensile Test

The elongation at break EB (%) was measured using a No. 3 dumbbell test piece made of the vulcanized rubber composition by a tensile test carried out at room temperature in accordance with JIS K 6251 "Rubber, vulcanized or thermoplastics—Determination of tensile stress-strain properties." A larger EB value indicates better elongation at break.

Drum Durability (High-Load Durability Drum Test)

Under the condition of a load of 230% of the maximum load (maximum internal pressure) under the JIS standard, the tire was run on a drum at a speed of 20 km/h to measure the running distance until the tire was damaged. Then, using the calculation formula below, the running distance of each tire was expressed as a durability index relative to that of a reference tire regarded as 100. A larger durability index indicates better durability and more favorable performance.

The reference tire was, in Table 2, a pneumatic tire produced with a combination of the rubber composition for a carcass topping A and the rubber composition for a sidewall I, and in Table 3, a pneumatic tire produced with a combination of the rubber composition for a carcass topping A and the rubber composition for a clinch I.

It is noted that the evaluation results on drum durability indicated in italics correspond to the Comparative Examples, and the evaluation results not indicated in italics correspond to the Examples.

(Durability index)=(Running distance of each tire)/(Running distance of reference tire)×100

TABLE 1

| | Rubber composition for carcass topping | | A | B | C | D | E | F |
|---|---|---|---|---|---|---|---|---|
| Formulation amounts (part(s) by mass) | Rubber component | NR | 70 | 70 | 70 | 70 | 70 | 70 |
| | | SBR | 30 | 30 | 30 | 30 | 30 | 30 |
| | Filler | Carbon black 1(N330) | 40 | 40 | 40 | 43 | 40 | 35 |
| | | Silica | 5 | 5 | 5 | 5 | 5 | 5 |
| | Antioxidant | Antioxidant | 1 | 1 | 1 | 1 | 1 | 1 |
| | Modified resorcinol resin | SUMIKANOL 620 | | | | | | 1.5 |
| | Methylene donor | SUMIKANOL 507A | | | | | | 1.8 |
| | Crosslinking activator | Zinc oxide | 5 | 5 | 5 | 5 | 5 | 5 |
| | | Stearic acid | 2 | 2 | 2 | 2 | 2 | 2 |
| | Vulcanizing agent | 10% oil-containing insoluble sulfur | 2.78 | 3.33 | 3.67 | 2.56 | 4 | 2.222 |
| | | (Total content of pure sulfur in vulcanizing agent) | 2.502 | 2.997 | 3.303 | 2.304 | 3.600 | 2.000 |
| | Vulcanization accelerator | TBBS | 1.5 | 1 | 0.7 | 1.5 | 0.5 | 1.5 |
| | Softener | Process oil | 9 | 9 | 9 | 9 | 9 | 4 |
| Evaluation results | Handling stability | E* 70° C. | 3.51 | 3.55 | 3.65 | 3.51 | 3.75 | 3.49 |
| | Fuel economy | tan δ 70° C. | 0.125 | 0.135 | 0.14 | 0.145 | 0.152 | 0.112 |
| | Elongation at break | EB % @RT | 475 | 525 | 555 | 460 | 575 | 575 |

TABLE 2

| Rubber composition for sidewall | | A | B | C | D | E | F | G | H | I | J | K | L |
|---|---|---|---|---|---|---|---|---|---|---|---|---|---|
| Formulation amounts (part(s) by mass) | Rubber component | NR | 60 | 60 | 60 | 60 | 60 | 60 | 60 | 60 | 60 | 60 | 60 | 60 |
| | | BR1(CB24) | 40 | 20 | 40 | 40 | 40 | 40 | 40 | 40 | 40 | 40 | 40 | 40 |
| | | BR2(BR1250H) | — | 20 | — | — | — | — | — | — | — | — | — | — |
| | Filler | Carbon black 2(N550) | 48 | 48 | 48 | 48 | 48 | 48 | 48 | 50 | 48 | 48 | 48 | 48 |
| | Antioxidizing agent | Wax | 2 | 2 | 2 | 2 | 2 | 2 | 2 | 2 | 2 | 2 | 2 | 2 |
| | | Antioxidant | 3 | 3 | 3 | 3 | 3 | 3 | 3 | 3 | 3 | 3 | 3 | 3 |
| | Crosslinking activator | Zinc oxide | 5 | 5 | 5 | 5 | 5 | 5 | 5 | 5 | 5 | 5 | 5 | 5 |
| | | Stearic acid | 2 | 2 | 2 | 2 | 2 | 2 | 2 | 2 | 2 | 2 | 2 | 2 |
| | Vulcanizing agent | 10% oil-containing insoluble sulfur | 2.33 | 2.33 | 1.89 | 1.73 | 2.45 | 1.89 | 1.89 | 2.33 | 1.5 | 1.11 | 1.5 | 3 |
| | | V200 (Sulfur content: 24% by mass) | — | — | — | — | — | — | — | — | — | — | 0.1 | — |
| | | TS3101 (Sulfur content: 27% by mass) | — | — | — | — | — | 1 | — | — | — | — | — | — |
| | | (Total content of pure sulfur in vulcanizing agent(s)) | 2.097 | 2.097 | 1.701 | 1.557 | 2.205 | 1.941 | 1.971 | 2.097 | 1.35 | 0.999 | 1.374 | 2.7 |
| | Vulcanization accelerator | TBBS | 0.7 | 0.7 | 0.9 | 1.3 | 0.55 | 0.6 | 0.7 | 0.8 | 1.5 | 2 | 0.7 | 0.4 |
| | Softener | C5 resin | 4 | 4 | 4 | 4 | 4 | 4 | 4 | — | 4 | 4 | 4 | 4 |
| | | Process oil | 5 | 5 | 5 | 5 | 5 | 5 | 5 | 11 | 5 | 5 | 5 | 5 |
| Evaluation results | | E* 70° C. | 4.72 | 4.65 | 4.65 | 4.7 | 4.81 | 4.75 | 4.88 | 4.75 | 4.65 | 4.71 | 4.72 | 4.95 |
| | | tan δ 70° C. | 0.118 | 0.095 | 0.113 | 0.108 | 0.137 | 0.094 | 0.092 | 0.126 | 0.111 | 0.107 | 0.107 | 0.165 |
| | | EB % @RT | 560 | 550 | 525 | 445 | 570 | 525 | 535 | 555 | 415 | 385 | 405 | 580 |

Evaluation on pneumatic tire produced with combination of Rubber composition for carcass topping A to F and Rubber composition for sidewall A to L

| | | A | B | C | D | E | F | G | H | I | J | K | L |
|---|---|---|---|---|---|---|---|---|---|---|---|---|---|
| Combination | Difference in sulfur content: (Carcass) – (Sidewall) | Carcass formulation A(Sulfur 2.5 parts, Oil 9 parts) | 0.403 | 0.403 | 0.799 | 0.943 | 0.295 | 0.559 | 0.529 | 0.403 | 1.15 | 1.501 | 1.126 | −0.2 |
| | | Carcass formulation B (Sulfur 3.0 parts, Oil 9 parts) | 0.903 | 0.903 | 1.299 | 1.443 | 0.795 | 1.059 | 1.029 | 0.903 | 1.65 | 2.001 | 1.626 | 0.3 |
| | | Carcass formulation C (Sulfur 3.3 parts, Oil 9 parts) | 1.203 | 1.203 | 1.599 | 1.743 | 1.095 | 1.359 | 1.329 | 1.203 | 1.95 | 2.301 | 1.926 | 0.6 |
| | | Carcass formulation D (Sulfur 2.3 parts, Oil 9 parts) | 0.203 | 0.203 | 0.599 | 0.743 | 0.095 | 0.359 | 0.329 | 0.203 | 0.95 | 1.301 | 0.926 | −0.4 |
| | | Carcass formulation E (Sulfur 3.6 parts, Oil 9 parts) | 1.503 | 1.503 | 1.899 | 2.043 | 1.395 | 1.659 | 1.629 | 1.503 | 2.25 | 2.601 | 2.226 | 0.9 |
| | | Carcass formulation F (Sulfur 2.0 parts, Oil 4 parts) | −0.097 | −0.097 | 0.299 | 0.443 | −0.205 | 0.059 | 0.029 | −0.097 | 0.65 | 1.001 | 0.626 | −0.7 |
| Evaluation results | Drum durability | Carcass formulationA(Sulfur 2.5 parts, Oil 9 parts) | 145 | 155 | 115 | 115 | 135 | 140 | 145 | 135 | 90 | 55 | 100 | 30 |
| | | Carcass formulation B (Sulfur 3.0 parts, Oil 9 parts) | 125 | 135 | 90 | 90 | 115 | 120 | 120 | 115 | 70 | 45 | 95 | 40 |
| | | Carcass formulation C (Sulfur 3.3 parts, Oil 9 parts) | 100 | 95 | 80 | 80 | 105 | 100 | 90 | 90 | 85 | 35 | 80 | 40 |
| | | Carcass formulation D (Sulfur 2.3 parts, Oil 9 parts) | 110 | 115 | 105 | 105 | 105 | — | — | 105 | 60 | — | — | — |
| | | Carcass formulation E (Sulfur 3.6 parts, Oil 9 parts) | 85 | 90 | 70 | 65 | 75 | — | — | — | — | — | — | — |
| | | Carcass formulation F(Sulfur 2.0 parts, Oil 4 parts) | — | 115 | 120 | — | 95 | — | — | — | — | — | — | — |

TABLE 3

| Formulation amounts (part(s) by mass) | Rubber composition for clinch | | A | B | C | D | E | F | G | H | I | J | K | L | M |
|---|---|---|---|---|---|---|---|---|---|---|---|---|---|---|---|
| | Rubber component | NR | 30 | 30 | 30 | 30 | 30 | 30 | 30 | 30 | 30 | 30 | 30 | 30 | 30 |
| | | BR1(CB24) | 70 | 50 | 70 | 70 | 70 | 70 | 70 | 70 | 70 | 70 | 70 | 70 | 70 |
| | | BR2(BR1250H) | — | 20 | — | — | — | — | — | — | — | — | — | — | — |
| | Filler | Carbon black 1(N330) | 65 | 65 | 65 | 65 | 65 | 65 | 65 | 67 | 65 | 65 | 65 | 65 | 65 |
| | Antioxidizing agent | Wax | 1 | 1 | 1 | 1 | 1 | 1 | 1 | 1 | 1 | 1 | 1 | 1 | 1 |
| | | Antioxidant | 3 | 3 | 3 | 3 | 3 | 3 | 3 | 3 | 3 | 3 | 3 | 3 | 3 |
| | Crosslinking activator | Zinc oxide | 3 | 3 | 3 | 3 | 3 | 3 | 3 | 3 | 3 | 3 | 3 | 3 | 3 |
| | | Stearic acid | 2 | 2 | 2 | 2 | 2 | 2 | 2 | 2 | 2 | 2 | 2 | 2 | 2 |
| | Vulcanizing agent | 10% oil-containing insoluble sulfur V200 (Sulfur content: 24% by mass) | 2.22 | 2.22 | 2.33 | 2.56 | 3.11 | 1.89 | 1.89 | 2.22 | 1.55 | 3.33 | 1.55 | 1.4 | 1.89 |
| | | TS3101 (Sulfur content: 27% by mass) | — | — | — | — | — | 1 | 1 | — | — | — | 0.1 | 7 | — |
| | | (Total content of pure sulfur in vulcanizing agent(s)) | 1.998 | 1.998 | 2.097 | 2.304 | 2.799 | 1.941 | 1.971 | 1.998 | 1.395 | 2.997 | 1.419 | 2.94 | 1.701 |
| | Vulcanization accelerator | TBBS | 3.4 | 3.4 | 3.2 | 2.7 | 1.5 | 3 | 3 | 3.6 | 3.5 | 1.3 | 3.5 | 0.4 | 3.8 |
| | Softener | C5 resin | 4 | 4 | 4 | 4 | 4 | 4 | 4 | 0 | 4 | 4 | 4 | 4 | 4 |
| | | Process oil | 5 | 5 | 5 | 5 | 5 | 5 | 5 | 11 | 5 | 5 | 5 | 5 | 5 |
| Evaluation results | Handling stability | E* 70° C. | 7.33 | 7.22 | 7.33 | 7.41 | 7.96 | 7.3 | 7.35 | 7.37 | 7.2 | 7.33 | 7.29 | 7.55 | 6.25 |
| | Fuel economy | tan δ 70° C. | 0.139 | 0.108 | 0.142 | 0.147 | 0.17 | 0.125 | 0.121 | 0.149 | 0.145 | 0.185 | 0.142 | 0.121 | 0.135 |
| | Elongation at break | EB % @RT | 240 | 245 | 255 | 275 | 275 | 230 | 240 | 225 | 225 | 280 | 220 | 185 | 235 |
| | | Evaluation on pneumatic tire produced with combination of Rubber composition for carcass topping A to F and Rubber composition for clinch A to M | | | | | | | | | | | | | |
| Combination | Difference in sulfur content: (Carcass) – (Clinch) | Carcass formulation A(Sulfur 2.5 parts, Oil 9 parts) | 0.502 | 0.502 | 0.403 | 0.196 | −0.299 | 0.559 | 0.529 | 0.502 | 1.105 | −0.497 | 1.081 | −0.44 | 0.799 |
| | | Carcass formulation B(Sulfur 3.0 parts, Oil 9 parts) | 1.002 | 1.002 | 0.903 | 0.696 | 0.201 | 1.059 | 1.029 | 1.002 | 1.605 | 0.003 | 1.581 | 0.06 | 1.299 |
| | | Carcass formulation C(Sulfur 3.3 parts, Oil 9 parts) | 1.302 | 1.302 | 1.203 | 0.996 | 0.501 | 1.359 | 1.329 | 1.302 | 1.905 | 0.303 | 1.881 | 0.36 | 1.599 |
| | | Carcass formulation D(Sulfur 2.3 parts, Oil 9 parts) | 0.302 | 0.302 | 0.203 | −0.004 | −0.499 | 0.359 | 0.329 | 0.302 | 0.905 | −0.697 | 0.881 | −0.64 | 0.599 |
| | | Carcass formulation E(Sulfur 3.6 parts, Oil 9 parts) | 1.602 | 1.602 | 1.503 | 1.296 | 0.801 | 1.659 | 1.629 | 1.602 | 2.205 | 0.603 | 2.181 | 0.66 | 1.899 |
| | | Carcass formulation F(Sulfur 2.0 parts, Oil 4 parts) | 0.002 | 0.002 | −0.097 | −0.304 | −0.799 | 0.059 | 0.029 | 0.002 | 0.605 | −0.997 | 0.581 | −0.94 | 0.299 |
| Evaluation results | Drum durability | Carcass formulation A(Sulfur 2.5 parts, Oil 9 parts) | 155 | 170 | 165 | 155 | 105 | 160 | 165 | 145 | 100 | 55 | 100 | 45 | 90 |
| | | Carcass formulation B(Sulfur 3.0 parts, Oil 9 parts) | 125 | 135 | 135 | 125 | 115 | 135 | 140 | 115 | 90 | 65 | 95 | 45 | 85 |
| | | Carcass formulation C(Sulfur 3.3 parts, Oil 9 parts) | 95 | 90 | 95 | 110 | — | 100 | 100 | 85 | 70 | 85 | 75 | 50 | 80 |
| | | Carcass formulation D(Sulfur 2.3 parts, Oil 9 parts) | 105 | 120 | 110 | 105 | 105 | — | — | — | 80 | — | — | — | 90 |
| | | Carcass formulation E(Sulfur 3.6 parts, Oil 9 parts) | 75 | 85 | 80 | 70 | 70 | — | — | — | 55 | — | — | — | 70 |
| | | Carcass formulation F(Sulfur 2.0 parts, Oil 4 parts) | — | 135 | — | 125 | — | — | — | — | — | — | — | — | — |

Tables 1 and 2 show that pneumatic tires including a sidewall and a carcass had excellent durability in which the sidewall was produced from a rubber composition for a sidewall with a specific sulfur content, the carcass was produced from a carcass cord covered with a rubber composition for a carcass topping, and the sulfur contents of the rubber composition for a sidewall and the rubber composition for a carcass topping satisfied a specific relationship. In addition, they also had satisfactory handling stability, fuel economy and elongation at break.

Pneumatic tires produced using the rubber composition for a sidewall H which had a larger content of process oil than the rubber composition for a sidewall A, had inferior durability compared to pneumatic tires produced using the rubber composition for a sidewall A.

Pneumatic tires produced using the rubber composition for a carcass topping A had very excellent durability. Pneumatic tires produced using the rubber composition for a carcass topping F had very excellent fuel economy.

Tables 1 and 3 show that pneumatic tires including a clinch and a carcass had excellent durability in which the clinch was produced from a rubber composition for a clinch with a specific sulfur content, the carcass was produced from a carcass cord covered with a rubber composition for a carcass topping, and the sulfur contents of the rubber composition for a clinch and the rubber composition for a carcass topping satisfied a specific relationship. In addition, they also had satisfactory handling stability, fuel economy and elongation at break.

Pneumatic tires produced using the rubber composition for a clinch H which had a larger content of process oil than the rubber composition for a clinch A, had inferior durability compared to pneumatic tires produced using the rubber composition for a clinch A.

Pneumatic tires produced using the rubber composition for a clinch E which had a smaller content of vulcanization accelerator than the rubber composition for a clinch A, had inferior durability compared to pneumatic tires produced using the rubber composition for a clinch A.

Pneumatic tires produced using the rubber composition for a carcass topping A had very excellent durability.

The invention claimed is:

1. A pneumatic tire comprising a sidewall and a carcass,
the sidewall being produced from a rubber composition for a sidewall which contains a rubber component and has a sulfur content of greater than 1.41 parts by mass but less than 2.5 parts by mass per 100 parts by mass of the rubber component,
the carcass being produced from a carcass cord covered with a rubber composition for a carcass topping which contains a rubber component, and
the sulfur contents of the rubber composition for a sidewall and the rubber composition for a carcass topping satisfying the following relationship:

$$-0.2 < \text{(the sulfur content per 100 parts by mass of the rubber component in the rubber composition for a carcass topping)} - \text{(the sulfur content per 100 parts by mass of the rubber component in the rubber composition for a sidewall)} < 1.1.$$

2. The pneumatic tire according to claim 1, wherein the rubber composition for a sidewall has a sulfur content of greater than 1.61 parts by mass but less than 2.3 parts by mass per 100 parts by mass of the rubber component.

3. The pneumatic tire according to claim 1, wherein the rubber composition for a carcass topping has a sulfur content of greater than 1.91 parts by mass but less than 3.5 parts by mass per 100 parts by mass of the rubber component.

4. The pneumatic tire according to claim 1, wherein the rubber composition for a sidewall has a process oil content of 10 parts by mass or less per 100 parts by mass of the rubber component.

5. The pneumatic tire according to claim 1, wherein the rubber composition for a sidewall has an alkylphenol-sulfur chloride condensate content of 0.2 to 6 parts by mass per 100 parts by mass of the rubber component.

6. The pneumatic tire according to claim 1,
wherein the rubber composition for a sidewall contains butadiene rubber synthesized using a rare-earth catalyst.

* * * * *